(12) United States Patent
Campbell, IV et al.

(10) Patent No.: US 10,768,914 B2
(45) Date of Patent: Sep. 8, 2020

(54) ANALYSIS AND GENERATION OF STRUCTURED PROGRAMMING BASED ON DISPARATE APPLICATION CONFIGURATIONS

(71) Applicant: Virtusa Corporation, Southborough, MA (US)

(72) Inventors: James H. Campbell, IV, Orlando, FL (US); Victor Arokoyu, Hampton, GA (US); Jianping Wang, Franklin Lakes, NJ (US); Kailash Chaudhary, Ashburn, VA (US); Vamshi Krishna Musthyala, Scottsdale, AZ (US)

(73) Assignee: Virtusa Corporation, Southborough, MA (US)

( * ) Notice: Subject to any disclaimer, the term of this patent is extended or adjusted under 35 U.S.C. 154(b) by 0 days.

(21) Appl. No.: 16/409,342

(22) Filed: May 10, 2019

(65) Prior Publication Data
US 2019/0369971 A1    Dec. 5, 2019

Related U.S. Application Data

(60) Provisional application No. 62/679,543, filed on Jun. 1, 2018.

(51) Int. Cl.
| | |
|---|---|
| *G06F 8/41* | (2018.01) |
| *G06F 8/10* | (2018.01) |

(Continued)

(52) U.S. Cl.
CPC ............... *G06F 8/433* (2013.01); *G06F 8/10* (2013.01); *G06F 8/75* (2013.01); *G06F 8/76* (2013.01); *G06F 9/541* (2013.01)

(58) Field of Classification Search
USPC ........................................................ 717/136
See application file for complete search history.

(56) References Cited

U.S. PATENT DOCUMENTS 8,601,490 B2 *  12/2013  Sureshan ............. G06Q 10/067
                                                          719/313
8,983,825 B2 *   3/2015  Sarr ........................ G06F 40/58
                                                            704/2

(Continued)

OTHER PUBLICATIONS

Krishnan, Sriram & Wagstrom, Patrick & von Laszewski, Gregor. (2002). "GSFL: A Workflow Framework for Grid Services", 14pg. (Year: 2002).*

*Primary Examiner* — Ryan D. Coyer
(74) *Attorney, Agent, or Firm* — Danielson Legal LLC

(57) ABSTRACT

A system for analysis and generation of structured programming is disclosed. The system includes a conduit core subsystem to generate an executable format file for migrating configurations of a first application to a second application. The conduit core subsystem includes a first application side conduit module to extract one or more first business objects of the first application and obtain one or more structured business objects and one or more first unidentified business objects. The conduit core subsystem includes a conduit core module to transmute the one or more structured business objects into a conduit core data structure. The conduit core subsystem includes a second application side conduit module to analyse the conduit core data structure based on one or more second business objects of the second application and transmute the conduit core data structure to generate the executable format file for the second application.

12 Claims, 5 Drawing Sheets

(51) Int. Cl.
*G06F 8/75* (2018.01)
*G06F 9/54* (2006.01)
*G06F 8/76* (2018.01)

(56) References Cited

U.S. PATENT DOCUMENTS

| | | | |
|---|---|---|---|
| 9,426,027 B1* | 8/2016 | Kaukl | H04L 67/306 |
| 2005/0160104 A1* | 7/2005 | Meera | G06F 8/36 |
| 2005/0278270 A1* | 12/2005 | Carr | G06Q 10/10 |
| | | | 706/25 |
| 2013/0013992 A1* | 1/2013 | Jalkanen | G06F 16/9558 |
| | | | 715/207 |
| 2013/0104100 A1* | 4/2013 | Mueller | G06F 9/45512 |
| | | | 717/106 |
| 2019/0042606 A1* | 2/2019 | Griffith | G06F 16/2272 |
| 2019/0079968 A1* | 3/2019 | Griffith | G06F 16/2282 |

* cited by examiner

ANALYSIS AND GENERATION OF STRUCTURED PROGRAMMING BASED ON DISPARATE APPLICATION CONFIGURATIONS

CROSS-REFERENCE TO RELATED APPLICATIONS

The present application claims the benefit of and priority to U.S. provisional application No. 62/679,543, filed on Jun. 1, 2018, the entire disclosure of which is hereby incorporated by reference as if set forth in its entirety herein.

BACKGROUND

Embodiments of a present disclosure relate to management of information handling systems and more particularly to a system and a method for analysis and generation of structured programming based on disparate application configurations.

As the value and use of information continues to increase, individuals and businesses seek additional ways to process and store information. Further, businesses purchase solutions to solve problems associated with such information handling systems. Such solutions require that the buyer additionally invest into configuration and customization of the solution that is purchased in order to fit the needs of the business. Such customizations are standard in the practice of implementing off-the-shelf products to solve business problems.

One issue is that organizations spend thousands of man days to collect and implement the solution that sits on top of the purchased "off the shelf" (disparate) application only to find that the final result is unmatched with the needs intended. Such significant investment slows the decision to migrate to a different off the shelf application.

Moreover, application vendors are already capable of identifying the differences between their out of the box application and a competitor's out of the box application and some have a method for migrating an unmodified implementation from one such application to another. However, these methods are not applicable when the customer has made configurations and customizations to the default application.

Hence, there is a need for an improved system and method for analysis and generation of structured programming based on disparate application configurations to address the aforementioned issues.

SUMMARY

In accordance with an embodiment of a present disclosure, a system for analysis and generation of structured programming based on disparate application configurations is provided. The system includes a conduit core subsystem configured to generate a file in an executable format for migrating a plurality of configurations of a first application to a second application. The conduit core subsystem includes a first application side conduit module configured to extract one or more first business objects and corresponding first set of artifacts from meta data of the first application and identify a correlation between each first business object and the corresponding artifact. The first application side conduit module is also configured to obtain one or more structured business objects and one or more first unidentified business objects upon identifying the correlation between each first business object and the corresponding artifact of the first application. The conduit core subsystem also includes a conduit core module operatively coupled to the first application side conduit module. The conduit core module is configured to transmute the one or more structured business objects received from the first application side conduit module into a conduit core data structure. The conduit core subsystem further includes a second application side conduit module operatively coupled to the conduit core module. The second application side conduit module is configured to analyse the conduit core data structure based on one or more second business objects and corresponding second set of artifacts of the second application. The second application side conduit module is also configured to identify a correlation between each second business object and the corresponding artifact of the second application to obtain one or more organized business objects and one or more second unidentified business objects. The second application side conduit module is further configured to compute a scoring matrix representative of an estimation of one or more requirements for the second application based on the identified correlation. The second application side conduit module is further configured to transmute the conduit core data structure based on a computed scoring matrix to generate the file in the executable format for the second application.

In accordance with another embodiment of the present disclosure, a method for analysis and generation of structured programming based on disparate application configurations is provided. The method includes extracting, by a first application side conduit module, one or more first business objects and corresponding first set of artifacts from meta data of the first application and identify a correlation between each first business object and the corresponding artifact. The method also includes obtaining, by the first application side conduit module, one or more structured business objects and one or more first unidentified business objects upon identifying the correlation between each first business object and the corresponding artifact of the first application. The method further includes transmuting, by a conduit core module, the one or more structured business objects received from the first application side conduit module into a conduit core data structure. The method further includes analysing, by a second application side conduit module, the conduit core data structure based on one or more second business objects and corresponding second set of artifacts of the second application. The method further includes identifying, by the second application side conduit module, a correlation between each second business object and the corresponding artifact of the second application to obtain one or more organized business objects and one or more second unidentified business objects. The method further includes computing, by the second application side conduit module, a scoring matrix representative of an estimation of one or more requirements for the second application based on the identified correlation. The method further includes generating, by the second application side conduit module, a file in an executable format by transmuting the conduit core data structure based on a computed scoring matrix. The method further includes migrating, by the second application side conduit module, a plurality of configurations of a first application to a second application based on generated file in the executable format.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
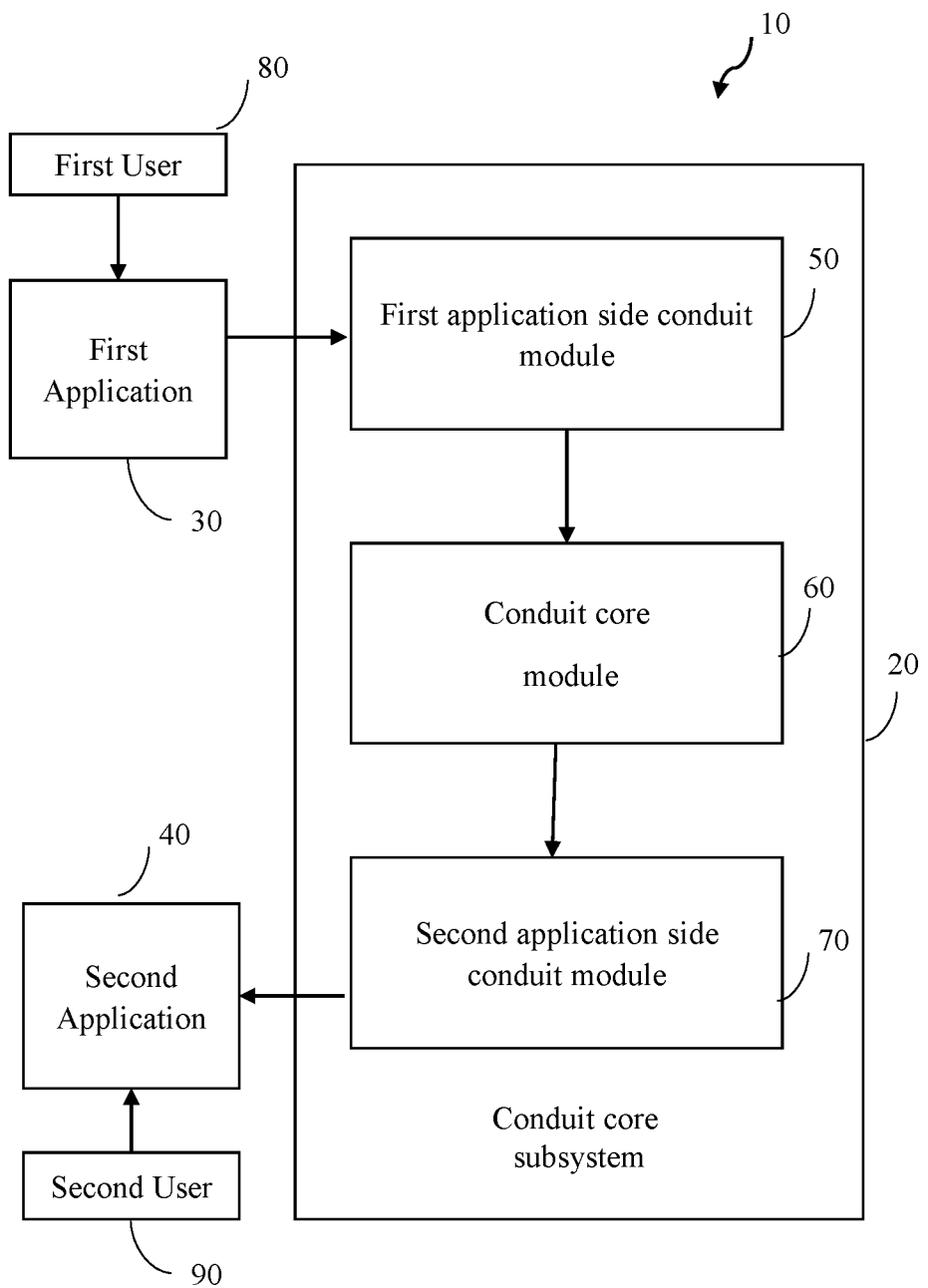
FIG. 1 is a block diagram representation of a system for analysis and generation of structured programming based on disparate application configurations in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of a present disclosure relate to a system for analysis and generation of structured programming based on disparate application configurations. The system includes a conduit core subsystem configured to generate a file in an executable format for migrating a plurality of configurations of a first application to a second application. The conduit core subsystem includes a first application side conduit module configured to extract one or more first business objects and corresponding first set of artifacts from meta data of the first application and identify a correlation between each first business object and the corresponding artifact. The first application side conduit module is also configured to obtain one or more structured business objects and one or more first unidentified business objects upon identifying the correlation between each first business object and the corresponding artifact of the first application. The conduit core subsystem also includes a conduit core module operatively coupled to the first application side conduit module. The conduit core module is configured to transmute the one or more structured business objects received from the first application side conduit module into a conduit core data structure.

The conduit core subsystem further includes a second application side conduit module operatively coupled to the conduit core module. The second application side conduit module is configured to analyse the conduit core data structure based on one or more second business objects and corresponding second set of artifacts of the second application. The second application side conduit module is also configured to identify a correlation between each second business object and the corresponding artifact of the second application to obtain one or more organized business objects and one or more second unidentified business objects. The second application side conduit module is further configured to compute a scoring matrix representative of an estimation of one or more requirements for the second application based on the identified correlation. The second application side conduit module is further configured to transmute the conduit core data structure based on a computed scoring matrix to generate the file in the executable format for the second application.

FIG. 1 is a block diagram representation of a system 10 for analysis and generation of structured programming based on disparate application configurations in accordance with an embodiment of the present disclosure. The system 10 includes a conduit core subsystem 20 which is configured to generate a file in an executable format for migrating a plurality of configurations of a first application 30 to a second application 40. As used herein, the configurations are defined as a way in which components are arranged to make up the computer system. The configuration consists of both hardware and software components. The conduit core subsystem 20 includes a first application side conduit module 50, a conduit core module 60 and a second application side conduit module 70. The conduit core module 60 is operatively coupled to the first application side conduit module 50 and the second application side conduit module 70. As used herein, the term "conduit core" is defined as an intuitive model for describing hierarchical scientific data in various programming languages. The conduit core is used for data coupling between packages in-core, serialization, and input/output tasks. The conduit core subsystem 20 instantiates a process that initializes itself as well as has the characteristics of the first application side conduit module 50 constructs. In addition, the conduit core subsystem 20 initializes itself to have the characteristics for the second application side conduit module 70 constructs. In such process, a first user 80 representative of the first application 30 and a second user 90 representative of the second application 40 has the capability to select from a list of the standard objects and build one or more structures of the conduit core module 60.

The first application side conduit module 50 is configured to extract one or more first business objects and corresponding first set of artifacts from meta data of the first application 30 and identify a correlation between each first business object and the corresponding artifact. As used herein, the term "business object" is defined as an entity within a multitiered software application that works in conjunction with the data access and business logic layers to transport data. As used herein, "meta data" is a data of data and indicates how business objects of first application are put together. Similarly, the term "artifacts" is defined as a tangible by-product produced during the development of a software to help describe the function, architecture, and design of software. In one embodiment, the one or more business objects may include a screen layout, a button, a business process flow, a utility function and one or more configuration of service level agreements. The first application 30 is capable of knowing the one or more first business objects and how the textual specifications of the one or more first business objects are constructed. The textual specification defines the syntactic content of a data file which may contain any natural language linguistic expression. The first application 30 has a library of the one or more business objects identified and known structures that the first application side conduit module 50 is configured to analyse and transmute into the conduit core data structure.

The first application side conduit module 50 is also configured to obtain one or more structured business objects and one or more first unidentified business objects upon identifying the correlation between each first business object and the corresponding artifact of the first application 30. The term "structured business object" is defined as the business objects whose sequences and linkages among the business objects are defined in the first application. Similarly, the term "unidentified business object" is defined as the business objects whose sequences and linkages among the business objects are missing in the application. In one embodiment, the one or more first unidentified business objects may be interrogated to the first user 80 representative of the first application 30, to fill a gap analysed during identification of correlation between each first business object and the corresponding artifact.

Furthermore, the conduit core module 60 is configured to transmute the one or more structured business objects received from the first application side conduit module 50 into a conduit core data structure. As used herein, the term "conduit core data structure" is defined as a data structure which is a collection of data values, the relationships among them, and the functions or operations that may be applied to the data. In some embodiments, the conduit core module 60 may be configured to transmute the one or more first unidentified business objects received from the first application side conduit module 50 into the conduit core data structure upon filling the gap. In a specific embodiment, the conduit core module 60 may be configured to maintain the translation between the first application 30 and the second application 40 offering the flexibility of either the first application 30 or the second application 40 to interpret the behaviours into the conduit core module 60 without consideration of another application.

Moreover, the second application side conduit core module 60 is configured to analyse the conduit core data structure based on one or more second business objects and corresponding second set of artifacts of the second application 40. The second application side conduit module 70 is also configured to identify a correlation between each second business object and the corresponding artifact of the second application 40 to obtain one or more organized business objects and one or more second unidentified business objects. The term "organized business object" is defined as the business objects whose sequences and linkages among the business objects are defined in the second application 40. In one embodiment, the one or more second unidentified business objects are interrogated to the second user 90 representative of the second application 40, to fill a gap analysed by the conduit core data structure. In such embodiment, the second application side conduit module 70 may be configured to fill the gap by interpreting at least one method, one or more properties, a plurality of screen designs and one or more process flows of the second application 40.

Further, the second application side conduit module 70 is configured to compute a scoring matrix representative of an estimation of one or more requirements for the second application 40 based on the identified correlation upon obtaining the one or more organized business objects and filled gap between the second unidentified business objects. In some embodiments, the first application side conduit module 50 may be configured to add a file, associate the file with a part a business object of the one or more business objects and the one or more second business objects in the conduit core module 60 upon obtaining the corresponding one or more first unidentified business objects and the one or more second unidentified business objects.

The second application side conduit core module 60 is configured to transmute the conduit core data structure based on a computed scoring matrix to generate the file in the executable format for the second application 40. In one embodiment, the executable format for the second application 40 may include at least one of a business process modelling language (BPML) mark up format and an extensible mark up language (XML) format. In such embodiment, the file in the executable format may include a plurality of documents with varying degrees of completion based on an expected outcome of the conduit core module 60. The expected outcome includes a plurality of compile ready structured documents, an estimation with key tasks identified for each first business object which has been transmuted and the identified gap of the second application 40 based on the interrogation with the second user 90 during the inquisition.

In operation, the system includes a conduit core subsystem 20 which is configured to generate a file in an executable format for migrating a plurality of configurations of a first application 30 to a second application 40. The conduit core subsystem 20 includes a first application side conduit module 50 which has been designed to understand the one or more first business objects and corresponding first set of artifacts of the first application's metadata and then obtain one or more structured business objects and one or more first unidentified business objects upon identifying the correlation between each first business object and the corresponding artifact of the first application 30. The first application side conduit module 50 is further configured to translate the structured files into the conduit core module 60. As the one or more structured business objects are being stored, the one or more first unidentified business objects are processed with an inquisition with the first user 80 familiar with the processes that a first customized application possesses. Such first customized application is therefore translated into a conduit core data structure.

The conduit core module 60 is responsible for maintaining a described meta-data view of the one or more first business objects and corresponding first set of artifacts of the first application 30 and through an interrogation of the one or more unidentified business objects (some automatic, some interactive), the conduit core module 60 finds the references between the objects stored and looks for one or more anomalies in the first unidentified business objects that the second application side conduit module 70 has marked as mandatory because of its understanding of the destination structure of objects in the second application 40. The second application side conduit module 70 then continues the process by examining the conduit core data structures in relationship to a final output required for the second application 40. The second application side conduit module 70 has the insight of what is required for the second application 40, identify a correlation between each second business object and the corresponding artifact of the second application 40 to obtain one or more organized business objects and one or more second unidentified business objects. Further, the second unidentified business objects are interrogated against the conduit core data structures to find those objects which are necessary to make the second application side conduit module 70 to properly deliver a transmuted set of structured, compile ready files along with a set of specifications and tasks necessary to deliver the second application 40 to an end state through the conduit core module 60.

Figure 2:
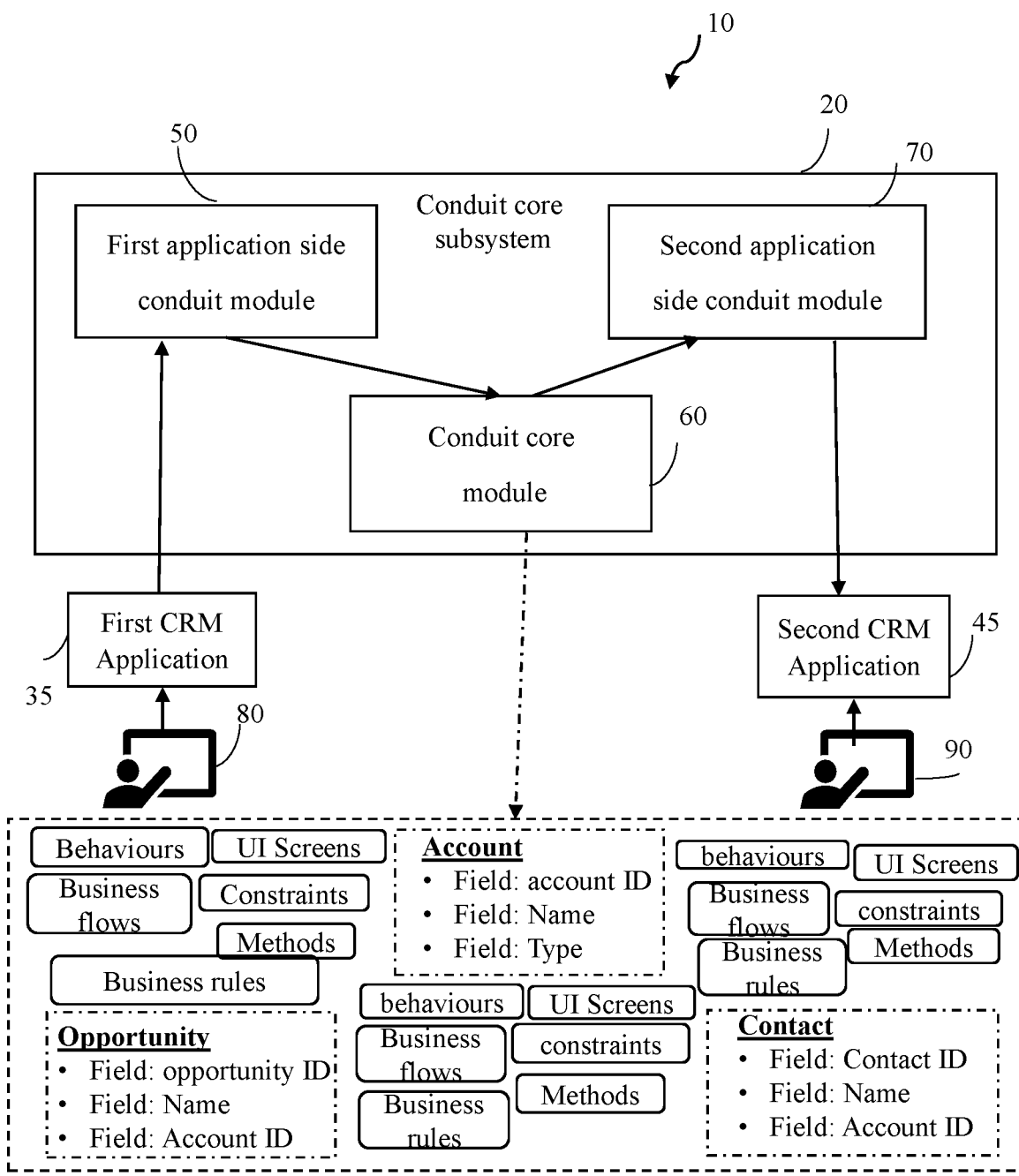
FIG. 2 is a schematic representation of a system for analysis and generation of structured programming based on disparate application configurations of FIG. 1 in accordance with an embodiment of the present disclosure.

FIG. 2 is a schematic representation of the system 10 for analysis and generation of structured programming based on disparate application configurations of FIG. 1 in accordance with an embodiment of the present disclosure. The conduit core subsystem 20 of the system is configured to handle a plurality of configurations of a first application 30 and the second application 40. In the current context, assume the first application 30 and the second application 40 include a first customer relationship management (CRM) tool-based application 35 and a second customer relationship management (CRM) tool-based application 45 of an organization.

The initialization of the conduit core subsystem 20 establishes one or more business objects for the first application side conduit module 50, the conduit core module 60 and the second application side conduit module 70 and the inquisition pathways for executing the process. In this embodiment, the first application side conduit module 50 is analysing the one or more first business objects from the meta-data that drive the first CRM application 35 as well as include the customizations done by the customer to obtain the one or more structured business objects, for example, the meta data includes custom business objects, user interface (UI) screens, and fields (ID, type or name), behaviours, business flows, business rules and constraints and use that insight to transmute the one or more structured business objects from the first CRM application 35 to the second CRM application 45. The first application side conduit module 50 is not restricted on the form in which the one or more structured business objects arrives. However, because of the insights of first CRM application 35, the one or more structured objects are known and examined because the first CRM application 35 piece is a constructed executable that recognizes one or more key objects both from a business data, and a meta-data definition. Examples of the one or more structured business objects include XML files, program source files, structured script files, or any other delimited form of structured text.

Upon obtaining the one or more structured business objects and the one or more first unidentified business objects, the first application side conduit module 50 interrogates the first user 80 who understands the mechanics of the implementation and may assist the first application side conduit module 50 to translate the data into a conduit core data structure. In such context, analysis of the one or more unidentified business objects as defined by the ingest of the one or more first business objects, the first application side conduit module 50 interrogates the first user 80 looking for the first set of artifacts that are not understood. An example is that, the first user 80 has a set of business objects ingested and the method at which they are taken, there is a need to correlate to base objects such as an Account or a Service Request, Opportunity or Contact. If the Account has ancillary business objects being consumed such as Account Managers or Favourite CSRs, the inquisition discovers those relationships and records them into the conduit core module 60. Within such inquisition, the first user 80 may want to remove functions or other artifacts that may be considered technical debt. While the first user 80 has the ability to not include things in order to remove technical debt, the first application side conduit module 50 ensures that gaps are not created in the understanding and checks for linkages as described above.

As a matter of design, the first application side conduit module 50 has no insight on what and how the second application side conduit module 70 is functioning. With this basic principle, the conduit core module 60 maintains the translation between the first CRM application 35 and the second CRM application 45 offering the flexibility of either first application side conduit module 50 or the second application side conduit interpreting the behaviours into the conduit core module 60 without consideration of another application. In such a way, the meta-data of the first CRM application 35 is interpreted into the conduit core data structure. For example, in the first application side conduit module 50, the first user may need to assist in those cases where the first CRM application 35 sees two distinct business objects and through recognition of them being on the same user interface (UI) screen layout or having proximity within the same business flow. In one embodiment, the conduit core module 60 may be configured to be located on a cloud based service platform or an executing service platform. Hence, the system does not require a database to store meta data of the first application side conduit module 50. The first application side conduit module 50 interrogates for specifically how the two business objects inter-relate and allow the first user 80 to confirm the detected pattern. From such inner workings, the conduit core module 60 cross-references the business objects and through the series of cross-references, compiles a clear understanding of not just the data from first CRM application 35 to the second CRM application 45, but how first application's functionalities are used on that data and how the second CRM application 45 might interpret and use such same functionalities.

Furthermore, the second application side conduit module 70 analyses the conduit core data structure and interrogates the second user 90 for how they wish to interpret the core definitions into the second CRM application 45. In such context, with an understanding of what the second CRM application 45 requires. A series of business flows are interrogated to the second user 90 through each second business object and the corresponding second set of artifacts such as methods, properties, UI screen designs, business rules, behaviours and process flows to interpret how the second application side conduit module 70 will use them. The second application side conduit module 70 then offers the second user 90 the ability to use the intended core options and also allows the second user 90 to select a more preferred method that the second application side conduit module 70 is constructing. For example, the second CRM application's account may need additional data around contacts, opportunities, or perhaps the service admin's key information. Such dealing of data along with the methods to collect and work that data based on what is in the conduit core module 60 versus what is in the second application side conduit module 70 is a key feature of the inquisition process.

Moreover, the second application side conduit module 70 then analyses a plurality of gaps, missing elements from the interpretation and interrogate to the second user 90 to fill a gap upon obtaining one or more second unidentified business objects during analysis of the conduit core data structure. The second application side conduit module 70 interrogate from the second user 90 on how to converge the second unidentified objects as it transmutes them into the second CRM application 45. One or more business objects which are unavailable, the second application side conduit module 70 responds by providing a gap requirement and specification in the output. Such gap specification provides the basis of a plan that allows the organization to examine what remains after the transmutation process completes. For example if the second user 90 looks in the conduit core module 60, a series of UI screens for which the second application side conduit module 70 may not interpret and translate, the second application side conduit module 70 asks the second user 90 and if the second user 90 may not be able to explain it, the "gap" exists in the implementation and the second application side conduit module 70 then writes the set of specifications that are missing for further enhancements outside of the conduit process.

Subsequently, the second application side conduit module 70 computes a scoring matrix that assesses an estimate for the remaining effort of the second user's goals. The second application side conduit module 70 further transmutes the conduit core data structure based on a computed scoring matrix to generate the file in the executable format for the second application. The second application side conduit module 70 transmutes the conduit core data structure in such a manner to generate the file and the corresponding artifact which may be compiled into the second application side conduit module 70 executable format. As an example, as a workflow may be represented as a BPML mark up, the output result from the Side B could take that BPML and provide that as a generated file given that the second CRM application 45 may use that BPML to build it in an executable manner.

The second application side conduit module 70 resulting output is then useful as the second CRM application 45 but may also be enhanced. Once again, if the specifications identify a gap, the output result may then be modified further to provide the end result based on the gap findings, the specifications provided, and the tasks to implement that specification.

Figure 3:
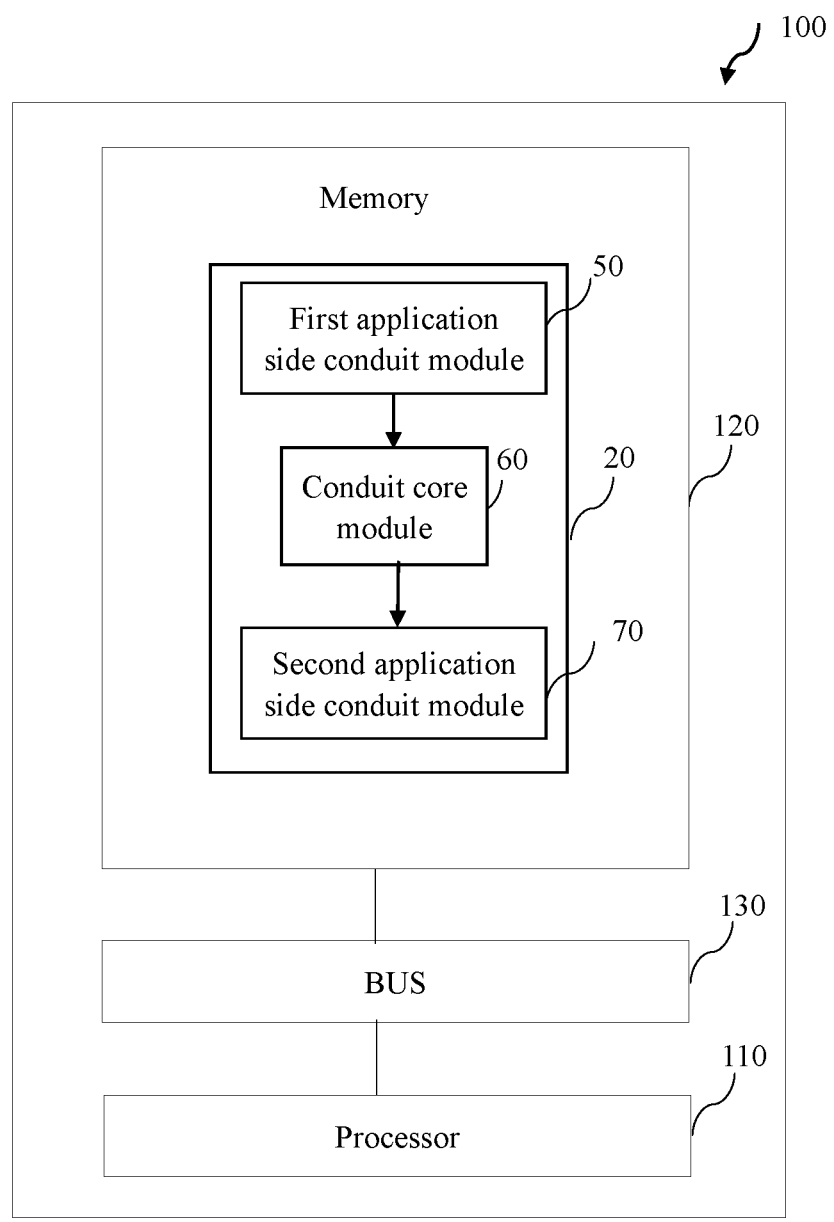
FIG. 3 is a block diagram of a computer or a server in accordance with an embodiment of the present disclosure; and FIG. 4(a)

FIG. 3 is a block diagram of a computer or a server 100 in accordance with an embodiment of the present disclosure. The server 100 includes processor(s) 110, and memory 120 coupled to the bus 130. As used herein, the processor 110 and memory 120 are substantially similar to conduit core subsystem 20 of FIG. 1

The processor(s) 110, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 120 includes a plurality of modules stored in the form of executable program which instructs the processor 110 to perform the method steps illustrated in FIG. 1. The memory 120 has following modules: the conduit core subsystem 20 which further includes a first application side conduit module 50, a conduit core module 60 and a second application side conduit module 70. The conduit core subsystem 20 configured to generate a file in an executable format for migrating a plurality of configurations of a first application to a second application 40. The first application side conduit module 50 configured to extract one or more first business objects and corresponding first set of artifacts from meta data of the first application and identify a correlation between each first business object and the corresponding artifact. The first application side conduit module 50 is also configured to obtain one or more structured business objects and one or more first unidentified business objects upon identifying the correlation between each first business object and the corresponding artifact of the first application 30. The conduit core subsystem 20 also includes a conduit core module 60 operatively coupled to the first application side conduit module 50. The conduit core module 60 is configured to transmute the one or more structured business objects received from the first application side conduit module 50 into a conduit core data structure.

The second application side conduit module 70 operatively coupled to the conduit core module 60. The second application side conduit module 70 is configured to analyse the conduit core data structure based on one or more second business objects and corresponding second set of artifacts of the second application 40. The second application side conduit module 70 is also configured to identify a correlation between each second business object and the corresponding artifact of the second application 40 to obtain one or more organized business objects and one or more second unidentified business objects. The second application side conduit module 70 is further configured to compute a scoring matrix representative of an estimation of one or more requirements for the second application 40 based on the identified correlation. The second application side conduit module 70 is further configured to transmute the conduit core data structure based on a computed scoring matrix to generate the file in the executable format for the second application 40.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 110.

Figure 4A:
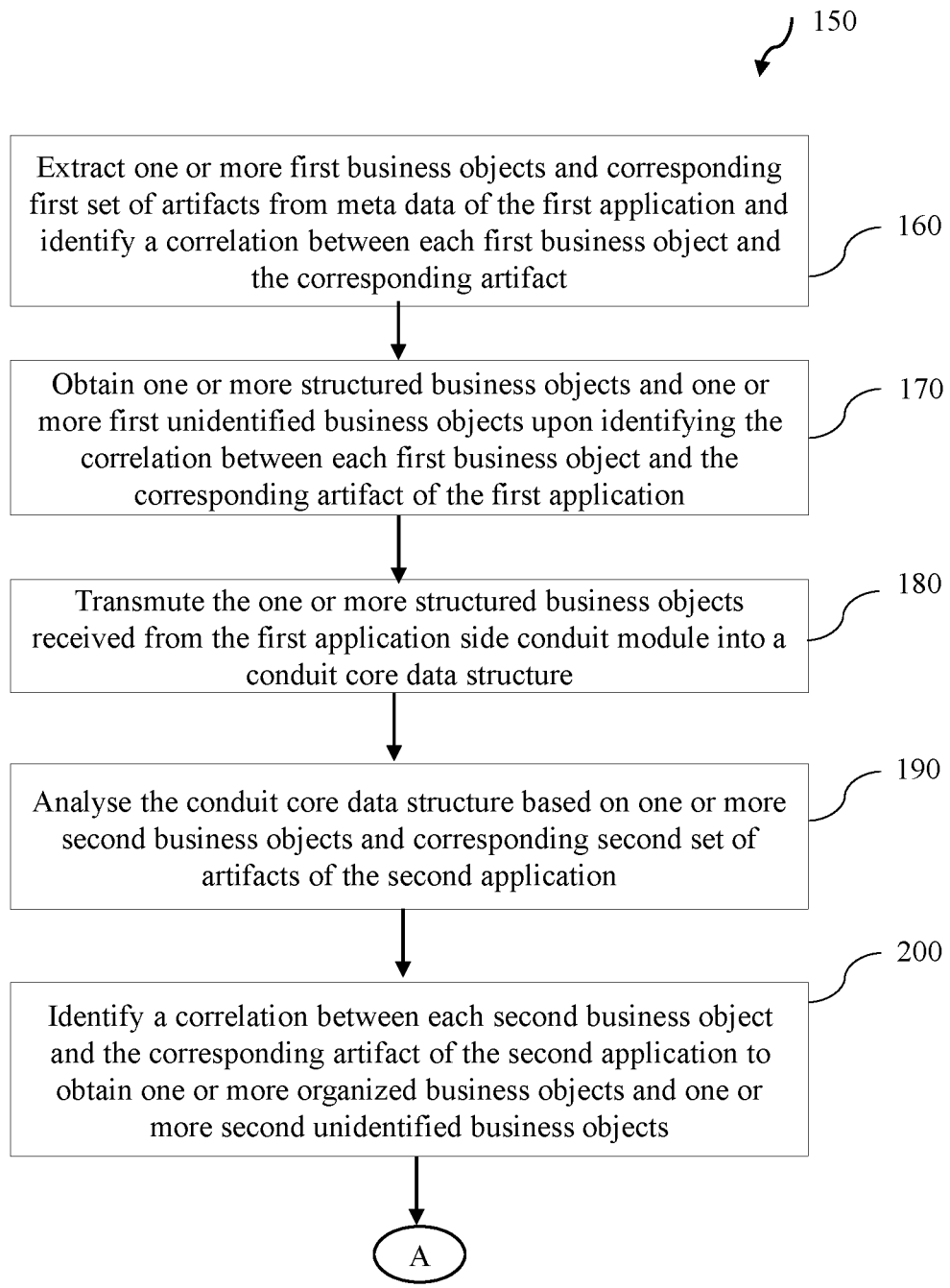
FIG. 4(b) is a flow chart representing the steps involved in a method for analysis and generation of structured programming based on disparate application configurations of FIG. 1, in accordance with an embodiment of the present disclosure.
Figure 4B:
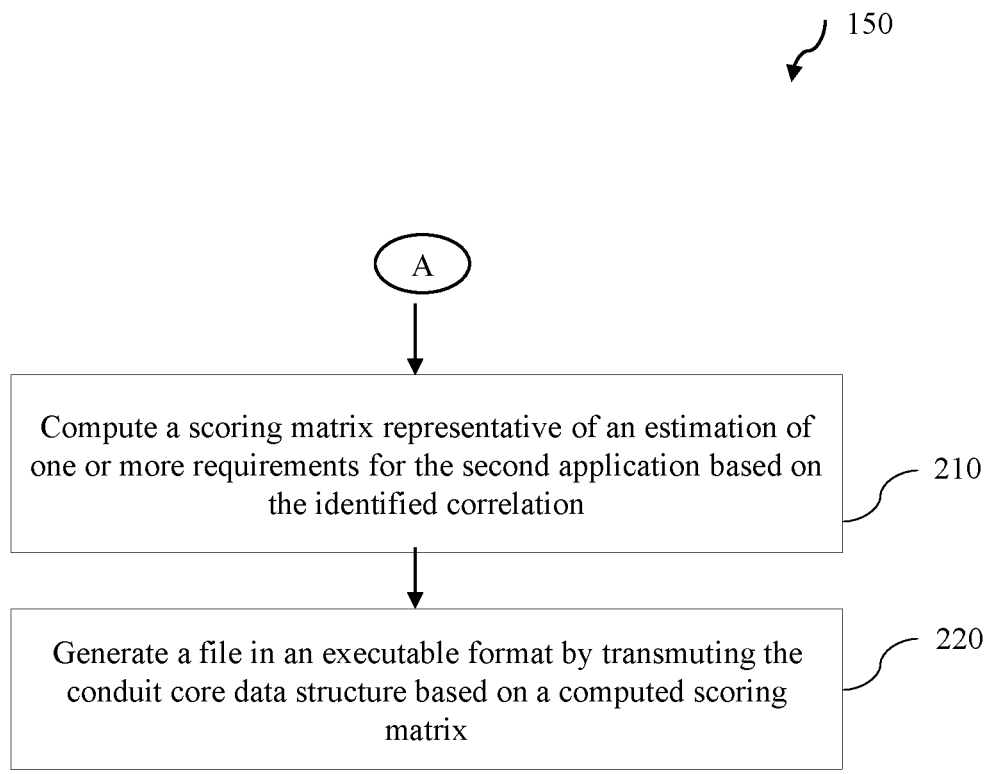

FIG. 4(*a*) is a flow chart representing the steps involved in a method 150 for analysis and generation of structured programming based on disparate application configurations of FIG. 1 and FIG. 4(b) is a continuation of the method steps mentioned in the FIG. 4(a), in accordance with an embodiment of the present disclosure. The method 150 includes extracting, by a first application side conduit module, one or more first business objects and corresponding first set of artifacts from meta data of the first application and identify a correlation between each first business object and the corresponding artifact in step 160. In one embodiment, extracting the one or more first business objects and corresponding first set of artifacts of the first application may include extracting a screen layout, a button, a business process flow, a utility function and one or more configuration of service level agreements. The method 150 also includes obtaining, by the first application side conduit module, one or more structured business objects and one or more first unidentified business objects upon identifying the correlation between each first business object and the corresponding artifact of the first application in step 170. In some embodiments, the method 150 may include interrogating the one or more first unidentified business objects to a first user representative of the first application, to fill a gap analysed during identification of correlation between each first business object and the corresponding artifact.

The method 150 further includes transmuting, by a conduit core module, the one or more structured business objects received from the first application side conduit module into a conduit core data structure in step 180. In one embodiment, the method 150 may include transmuting, by the conduit core module, the one or more first unidentified business objects received from the first application side conduit module into a conduit core data structure upon filling the gap. The method 150 further includes analysing, by a second application side conduit module, the conduit core data structure based on one or more second business objects and corresponding second set of artifacts of the second application in step 190. The method 150 further includes identifying, by the second application side conduit module, a correlation between each second business object and the corresponding artifact of the second application to obtain one or more organized business objects and one or more second unidentified business objects in step 200.

In one embodiment, the method 150 may include interrogating the one or more second unidentified business objects to a second user representative of the second application, to fill a gap analysed by analysing the conduit core data structure. In such embodiment, filling the gap analysed by the conduit core data structure may include filling the gap by interpreting at least one method, one or more properties, a plurality of screen designs and one or more process flows of the second application. In some embodiments, the method 150 may include adding a file, associating the file with a part a business object of the one or more business objects and the one or more second business objects in the conduit core module upon obtaining the corresponding one or more first unidentified business objects and the one or more second unidentified business objects.

Furthermore, the method 150 includes computing, by the second application side conduit module, a scoring matrix representative of an estimation of one or more requirements for the second application based on the identified correlation upon obtaining the one or more organized business objects and filled gap between the second unidentified business objects in step 210. The method 150 further includes transmuting, by the second application side conduit module, the conduit core data structure based on a computed scoring matrix to generate the file in the executable format for the second application in step 220. In one embodiment, transmuting the conduit core data structure based on a computed scoring matrix to generate the file in the executable format for the second application may include transmuting the conduit core data structure based on a computed scoring matrix to generate the file in at least one of a business process modelling language (BPML) mark up format and an extensible mark up language (XML) format for the second application.

The method 150 further includes migrating, by the second application side conduit module, a plurality of configurations of a first application to a second application based on generated file in the executable format in step 230. In one embodiment, migrating the plurality of configurations of the first application to the second application based on generated file in the executable format may include migrating a plurality of customized configurations of the first application to the second application based on generated file in the executable format Various embodiments of the system for analysis and generation of structured programming described above enables the migration of a solution from first application to the second application and leverage the elements of a custom configuration to the second application.

The system includes a conduit core subsystem which provides cross references of various objects and through the series of cross references, the conduit core subsystem compiles a clear understanding of not just the data from the first application to the second application, but how the first application's functionalities are used on that data and configurations and how the second application might interpret and use those same functionalities.

The system provides the facility to the user to interact with the system and provide the missing linkages between the objects and corresponding artifacts of the first application and the second application and make the system efficient for understanding the application and migrating it to another application.

Further stated, the system allows the first user and the second user to be selective with how much of the information is actually consumed into the conduit core module by the first application side conduit module. This brings the customer value as this part of the inquisition removes the technical debt as part of the transformation process through the conduit core module.

Moreover, the conduit core module is configured to maintain the translation between the first application and the second application offering the flexibility of either the first application or the second application to interpret the behaviours into the conduit core module without consideration of another application.

In addition, the second application side conduit module transmutes the conduit core data structure into the file in the executable format which require a less manpower and consume a lot of time to migrate the configurations of the first application to the second application.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method 150 in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for analysis and generation of structured programming comprising:
   a conduit core subsystem configured to generate a file in an executable format for migrating a plurality of configurations of a first application to a second application, wherein the conduit core subsystem comprises:
      a first application side conduit module configured to:
         extract one or more first business objects and corresponding first set of artifacts from meta data of the first application;
         identify a correlation between each first business object and the corresponding artifact;
         obtain one or more structured business objects and one or more first unidentified business objects upon identifying the correlation between each first business object and the corresponding artifact of the first application;
      a conduit core module operatively coupled to the first application side conduit module, wherein the conduit core module is configured to transmute the one or more structured business objects received from the first application side conduit module into a conduit core data structure;
      a second application side conduit module operatively coupled to the conduit core module, wherein the second application side conduit module is configured to:
         analyse the conduit core data structure based on one or more second business objects and corresponding second set of artifacts of the second application;
         identify a correlation between each second business object and the corresponding artifact of the second application to obtain one or more organized business objects and one or more second unidentified business objects;
         compute a scoring matrix representative of an estimation of one or more requirements for the second application based on the identified correlation; and
         transmute the conduit core data structure based on a computed scoring matrix to generate the file in the executable format for the second application.

2. The system of claim 1, wherein the one or more first business objects comprises a screen layout, a button, a business process flow, a utility function and one or more configuration of service level agreements.

3. The system of claim 1, wherein the first application side conduit module is configured to add a file, associate the file with a part an business object of the one or more first business objects and the one or more second business objects in the conduit core module upon obtaining the corresponding one or more first unidentified business objects and the one or more second unidentified business objects.

4. The system of claim 1, wherein the executable format for the second application comprises at least one of a business process modelling language (BPML) mark up format and an extensible mark up language (XML) format.

5. The system of claim 1, wherein the one or more first unidentified business objects are interrogated to a first user representative of the first application, to fill a gap analysed during identification of correlation between each first business object and the corresponding artifact.

6. The system of claim 1, wherein the conduit core module is configured to transmute the one or more first unidentified business objects received from the first application side conduit module into a conduit core data structure upon filling the gap.

7. The system of claim 1, wherein the one or more second unidentified business objects are interrogated to a second user representative of the second application, to fill a gap analysed in the conduit core data structure.

8. The system of claim 1, wherein the second application side conduit module is configured to fill the gap by interpreting at least one method, one or more properties, a plurality of screen designs and one or more process flows of the second application.

9. A method comprising:
   extracting, by a first application side conduit module, one or more first business objects and corresponding first set of artifacts from meta data of the first application
   identifying, by the first application side conduit module, a correlation between each first business object and the corresponding artifact;
   obtaining, by the first application side conduit module, one or more structured business objects and one or more first unidentified business objects upon identifying the correlation between each first business object and the corresponding artifact of the first application;
   transmuting, by a conduit core module, the one or more structured business objects received from the first application side conduit module into a conduit core data structure;
   analysing, by a second application side conduit module, the conduit core data structure based on one or more second business objects and corresponding second set of artifacts of the second application;
   identifying, by the second application side conduit module, a correlation between each second business object and the corresponding artifact of the second application to obtain one or more organized business objects and one or more second unidentified business objects;
   computing, by the second application side conduit module, a scoring matrix representative of an estimation of one or more requirements for the second application based on the identified correlation; and
   generating, by the second application side conduit module, a file in an executable format by transmuting the conduit core data structure based on a computed scoring matrix.

10. The method of claim 9, wherein generating the file in the executable format by transmuting the conduit core data structure based on the computed scoring matrix comprises generating the file in the executable format for migrating a plurality of configurations of the first application to the second application.

11. The method of claim 10, wherein migrating the plurality of configurations of the first application to the second application comprises migrating a plurality of customized configurations of the first application to the second application.

12. The method of claim 10, wherein generating the file in the executable format by transmuting the conduit core data structure based on the computed scoring matrix comprises generating the file in at least one of a business process modelling language (BPML) mark up format and an extensible mark up language (XML) format for the second application.

* * * * *